(12) United States Patent
Okuda et al.

(10) Patent No.: US 6,193,942 B1
(45) Date of Patent: Feb. 27, 2001

(54) CATALYST FOR DECOMPOSITION OF NITROGEN OXIDES AND METHOD FOR PURIFYING DIESEL ENGINE EXHAUST GAS BY THE USE OF THE CATALYST

(75) Inventors: Norimasa Okuda, Ibaraki; Makoto Horiuchi, Hyogo, both of (JP)

(73) Assignees: ICT Co., Ltd, Osaka (JP); International Catalyst Technology, Inc., Ridgefield Park, NJ (US)

( * ) Notice: Subject to any disclaimer, the term of this patent is extended or adjusted under 35 U.S.C. 154(b) by 0 days.

(21) Appl. No.: 09/033,410

(22) Filed: Mar. 2, 1998

Related U.S. Application Data

(63) Continuation of application No. 08/527,785, filed on Sep. 13, 1995, now abandoned.

(30) Foreign Application Priority Data

Sep. 14, 1994 (JP) ................................................ 6-220451

(51) Int. Cl.⁷ ................................................ C01B 21/00
(52) U.S. Cl. .................... 423/213.2; 423/213.5; 423/239.1
(58) Field of Search ............... 423/213.2, 213.5, 423/239.1

(56) References Cited

U.S. PATENT DOCUMENTS

| | | | |
|---|---|---|---|
| 4,904,633 | * 2/1990 | Ohata et al. ................ | 423/213.5 |
| 5,015,617 | * 5/1991 | Ohata et al. ................ | 502/349 |
| 5,047,378 | * 9/1991 | Kato et al. ................. | 502/60 |
| 5,106,802 | * 4/1992 | Horiuchi et al. ............ | 502/349 |
| 5,208,203 | * 5/1993 | Horiuchi et al. ............ | 423/215.5 |
| 5,328,672 | * 7/1994 | Montreuil et al. .......... | 423/213.2 |
| 5,336,476 | * 8/1994 | Kintaichi et al. ........... | 423/239.1 |

FOREIGN PATENT DOCUMENTS

530734 * 3/1993 (EP) .

* cited by examiner

*Primary Examiner*—Tom Dunn
(74) *Attorney, Agent, or Firm*—Omri M. Behr, Esq.

(57) ABSTRACT

A catalyst which is capable of decomposing and allaying particularly $NO_x$ among other harmful components in the diesel engine exhaust gas and, at the same time, depriving by combustion the exhaust gas of carbonaceous particulates, unburned hydrocarbons, and carbon monoxide and a method for purifying the diesel engine exhaust gas by the use of this catalyst are provided. The catalyst for the decomposition of the nitrogen oxides has a refractory three-dimensional structure coated with a copper-containing zirconia powder having deposited copper and the catalytically active oxide of at least one metal selected from the group consisting of tungsten, gallium, nickel, manganese, iron, and cobalt on a zirconia powder. The method for purifying the diesel engine exhaust gas uses the catalyst.

12 Claims, No Drawings

CATALYST FOR DECOMPOSITION OF NITROGEN OXIDES AND METHOD FOR PURIFYING DIESEL ENGINE EXHAUST GAS BY THE USE OF THE CATALYST

RELATED APPLICATIONS

This application is a continuation of application, Ser. No. 08/527,785 filed Sep. 13, 1995 now abandoned.

BACKGROUND OF THE INVENTION

1. Field of the Invention

This invention relates to a catalyst for the decomposition of nitrogen oxides and a method for purifying a diesel engine exhaust gas by the use of the catalyst. More particularly, it relates to a catalyst which is capable of decomposing and allaying particularly nitrogen oxides ($NO_x$) among other harmful components in the diesel engine exhaust gas and, at the same time, depriving by combustion the exhaust gas of carbonaceous particulates, unburned hydrocarbons, and carbon monoxide and a method for purifying the diesel engine exhaust gas by the use of this catalyst.

2. Description of the Prior Art

The nitrogen oxides (hereinafter referred to as "$NO_x$") in the diesel engine exhaust gas cause photochemical smog and acidic rain. In recent years, since the emission of the $NO_x$ from the diesel engines has been posing a social issue particularly in the urban districts, the alleviation of this emission is an important consideration. For this reason, studies aimed at a catalyst for the disposal of the exhaust gas are now under way. Further, since the diesel engine exhaust gas contains particulates harmful to the physical health, the catalyst for the disposal of the exhaust gas of this nature is naturally expected to be capable of decomposing the $NO_x$ and repressing these particulates as well.

It has been customary heretofore to use a three way catalyst for the purpose of purifying the exhaust gas from an automobile. Since the exhaust gas from a diesel engine excessively contains oxygen, however, the ordinary three way catalyst is incapable of thoroughly allaying the $NO_x$.

A catalyst having copper deposited on a porous carrier such as of zeolite, alumina, or silica as disclosed in JP-A-63-100,919, for example, has been available for the removal of the $NO_x$ from the exhaust gas of a diesel engine or the exhaust gas of a gasoline-lean burn engine which contains oxygen in a large quantity. This catalyst, however, is at a disadvantage in being deficient in resistance to heat and liable to be poisoned by sulfur oxides.

A method for removing the $NO_x$ by using platinum as a main catalyst in the presence of sulfur oxides has been disclosed, for example, in JP-A-05-137,963. This platinum containing catalyst naturally is highly active in oxidizing $SO_2$. When it is used in the disposal of the diesel engine exhaust gas, therefore, it increases sulfate group owing to the oxidation of $SO_2$ and possibly increases particulates rather than decreases them.

As remarked above, the catalysts heretofore proposed for the removal of nitrogen oxides still have a problem from the practical point of view for the purpose of purifying the exhaust gas from a diesel engine.

It is an object of this invention, therefore, to provide a novel catalyst for the decomposition of nitrogen oxides and a method for purifying the diesel engine exhaust gas by the use of this catalyst.

Another object of this invention is to provide a catalyst which is enabled by the addition of a reducing agent to attain efficient decomposition of the $NO_x$ in the diesel engine exhaust gas and a method for the use of this catalyst.

Still another object of this invention is to provide a catalyst which effects removal by combustion of such harmful components as unburned hydrocarbons and carbon monoxide, allays particulates, and possesses an ability to withstand elevated temperatures.

SUMMARY OF THE INVENTION

The objects mentioned above are accomplished by a catalyst for the decomposition of nitrogen oxides, having a refractory three-dimensional structure coated with a copper-containing zirconia powder having deposited copper the catalytically active oxide of at least one metal selected from the group consisting of tungsten, gallium, nickel, manganese, iron, and cobalt on a zirconia powder, wherein the zirconia powder has a BET specific surface area in the range of 50 to 200 m²/g and an average primary particle diameter in the range of 50 to 200 Å.

This invention further concerns the catalyst for the decomposition of nitrogen oxides, wherein the refractory three-dimensional structure is an open-flow ceramic honeycomb or metal honeycomb. This invention further concerns the catalyst for the decomposition of nitrogen oxides, wherein the copper content as element is in the range of 5 to 50% by weight based on the zirconia powder and in the range of 4 to 100 g per liter of the refractory three-dimensional structure. This invention further concerns the catalyst for the decomposition of nitrogen oxides, wherein the amount of the catalytically active oxide of at least one metal to be used in combination with copper is in the range of 2 to 40% by weight based on the copper element. This invention further concerns the catalyst for the decomposition of nitrogen oxides, wherein the amount of the zirconia powder is in the range of 50 to 250 g per liter of the refractory three-dimensional structure.

The objects mentioned above are also accomplished by a method for the removal of nitrogen oxides in a diesel engine exhaust gas, which comprises exposing to the catalyst the diesel engine exhaust gas whose $HC/NO_x$ molar ratio is in the range of 0.5 to 20 (HC reduced to methane concentration). The objects are also accomplished by a method for the removal of nitrogen oxides in a diesel engine exhaust gas, which comprises injecting a reducing agent into the diesel engine exhaust gas and exposing the exhaust gas to the catalyst mentioned above.

This invention further concerns the method for the removal of the nitrogen oxides, wherein the temperature of the exhaust gas into which the reducing agent is injected is in the range of 200° to 500° C. This invention further concerns the method for the removal of nitrogen oxides, wherein the reducing agent is gas oil.

The catalytic component of the catalyst according to this invention has the ability to adsorb hydrocarbons which function as a reducing agent for nitrogen oxides. The use of this catalytic component, therefore, enhances the ability of the catalyst to decompose the $NO_x$ and the ability thereof to purge such substances as unburned hydrocarbons and particulates. To be specific, since the catalyst of this invention has a notable ability to decompose the $NO_x$, manifests the effect of repressing particulates, and excels in the ability to withstand elevated temperatures as shown in Table 1, it is useful as a catalyst for purifying the diesel engine exhaust gas.

DESCRIPTION OF THE PREFERRED EMBODIMENT

The catalyst of the present invention for the decomposition of nitrogen oxides is produced by coating a refractory three-dimensional structure with a copper-containing zirconia powder having deposited copper and the catalytically active oxide of at least one metal selected from the group consisting of tungsten, gallium, nickel, manganese, iron, and cobalt on a zirconia powder.

First, the catalytically active oxide to be used in this invention is the oxide of at least one member selected from the group consisting of tungsten, gallium, nickel, manganese, iron, and cobalt, preferably the oxide of iron, tungsten, nickel, or manganese.

This catalytically active oxide is deposited in combination with copper on a zirconia powder to form the copper-containing zirconia powder.

The copper-containing zirconia powder is made to coat the refractory three-dimensional structure.

The copper content as element is in the range of 5 to 50% by weight, preferably 10 to 20% by weight, based on the zirconia powder and in the range of 4 to 100 g, preferably 10 to 40 g, per liter of the refractory three-dimensional structure. If the copper content is less than the lower limit of the range mentioned above, the ability of the catalyst to decompose the $NO_x$ will be unduly low. Conversely, if the amount of copper to be deposited exceeds the upper limit of the range mentioned above, the excess will bring about no proportionate addition to the ability of the catalyst to decompose the $NO_x$ and will prove wasteful. As the starting material for the copper, nitrate, sulfate, and other similar inorganic salts and acetate and other similar organic salts of copper, water-soluble grains which are readily converted by calcination into copper oxide, and copper oxide are available. As concrete examples of the starting material, copper nitrate, copper acetate, and copper oxide maybe cited.

The amount of the catalytically active oxide of at least one metal to be deposited in combination with copper on the refractory three-dimensional structure is in the range of 2 to 40% by weight, preferably 5 to 20% by weight, as oxide based on the amount of copper (as element) and in the range of 0.1 to 16 g, preferably 1.0 to 10 g, per liter of the refractory three-dimensional structure. If the amount of the catalytically active oxide to be used is less than the lower limit of the range mentioned above, the effect of the catalytically active oxide will be unduly low. Conversely, if this amount exceeds the upper limit of the range mentioned above, the excess will bring about no proportionate addition to the effect of the catalytically active oxide. As the starting material for the catalytically active oxide, nitrate, sulfate, carbonate, phosphate, chloride, hydroxide, oxide, and other inorganic salts and acetate and other organic salts of the metal mentioned above are available.

In this invention, these catalytic components are used as deposited on a zirconia powder. The zirconia powder is capable of affording a catalyst excelling in activity and ability to withstand elevated temperatures as compared with other powders of such inorganic oxides as alumina and zeolite.

Appropriately, the zirconia powder to be used in this invention has a Brunauer-Emmett-Teller (hereinafter referred to as "BET") surface area in the range of 50 to 200 $m^2/g$, preferably 60 to 120 $m^2/g$. The average primary particle diameter of the zirconia powder is in the range of 50 to 200 Å, preferably 60 to 140 Å.

Zirconia, among other inorganic oxides, proves particularly advantageous in respect that it can afford a catalyst excelling in activity and durability. It has been ascertained to the inventors that in order for the catalyst to acquire high activity, it is important that the refractory inorganic oxide destined to form a substrate for the catalyst have an amply large surface area and exhibit an ability to disperse copper to a certain extent and not to an unduly high extent. It has been established in this respect that zirconia possessing such a BET specific surface area and average primary particle diameter as mentioned above is most suitable.

The amount of the refractory inorganic oxide powder to be used is in the range of 50 to 250 g, preferably 70 to 200 g, per liter of the refractory three-dimensional structure. If this amount is less than 50 g/liter, this inorganic oxide powder will fail to acquire a fully satisfactory quality. Conversely, if the amount exceeds 250 g/liter, the excess will bring about no proportionate addition to the quality.

The refractory three-dimensional structure to be used in this invention may be in the form of pellets or a monolithic carrier. The monolithic carrier is used preferably. The honeycomb carrier using such a material as cordierite, mullite, a-alumina, zirconia, titania, titanium phosphate, aluminum titanate, betalite, spondumen, alumino-silicate, or magnesium silicate is used appropriately. The honeycomb carrier made of cordierite, among other materials mentioned above, proves particularly advantageously. Besides, a monolithic structure made of such a heat-resistant metal as stainless steel or Fe—Cr—Al alloy which is resistant to oxidation can be used.

The monolithic carrier is produced by the extrusion molding method or the method of tightly rolling a sheet material, for example. The openings formed in the monolithic carrier for passage of a gas (shape of cells) may be in the shape of a hexagon, tetragon, triangle, or corrugation. For fully satisfactory service, the monolithic carrier is only required to have a cell density (number of cells/unit cross-sectional area) falling in the range of 150 to 600 cells/square inch, preferably 200 to 500 cells/square inch.

For this invention, the method for depositing the catalytic component on the carrier is not particularly limited. The method of impregnation is generally adopted for the deposition.

The catalyst according to this invention can be prepared, for example, by the following method.

First, the refractory inorganic oxide powder is placed in and impregnated with an aqueous solution containing copper oxide in a prescribed amount and the compound of at least one metal. The resultant impregnated powder is then dried at a temperature in the range of 80° to 250° C., preferably 100° to 150° C., and the dried impregnated powder is subsequently calcined at a temperature in the range of 300° to 850° C., preferably 400° to 600° C., for a period in the range of 0.5 to 5 hours, preferably 1 to 2 hours. Consequently, a powder having the oxides of metals deposited on the refractory inorganic oxide is obtained.

Then, the powder obtained as described above is wet ground into a slurry. The refractory three-dimensional structure is impregnated with the slurry. The resultant wet structure is then deprived of excess slurry, dried at a temperature in the range of 80° to 250° C., preferably 100° to 150° C., and calcined at a temperature in the range of 300° to 800° C., preferably 400° to 600° C., for a period in the range of 0.5 to 3 hours, preferably 1 to 2 hours, to coat the refractory three-dimensional structure with the catalytic composition.

In this invention, when the diesel engine exhaust gas whose $HC/NO_x$ molar ratio is in the range of 0.5 to 20 (HC for the total carbon concentration as methane), preferably 1 to 10, is exposed to the catalyst mentioned above, nitrogen oxides in the exhaust gas are removed. Specifically, if the $HC/NO_x$ ratio is smaller than the lower limit of the range mentioned above, the catalyst will not acquire a fully satisfactory activity to decompose the $NO_x$. Conversely, if the $HC/NO_x$ ratio exceeds the upper limit of the range mentioned above, the excess will not bring about a proportionate addition to the activity of the catalyst and the HC will not be completely burned but will be released from the catalyst.

In this invention, when the exhaust gas has a too low HC content to obtain a fully satisfactory activity to decompose the $NO_x$, the $HC/NO_x$ ratio can be suitably adjusted for the purpose of reaction by injecting a reducing agent into the upstream side of the catalyst in the exhaust gas at a temperature in the range of 200° to 500° C., preferably 300° to 450° C.

Ammonia, hydrogen, and various hydrocarbons have been known as reducing agents useful for the reduction of nitrogen oxides. When the catalyst is used as mounted on an automobile, it is advantageous to use gas oil as the reducing agent from the viewpoint of convenience of system and economy. In the present invention, gas oil is appropriately used. Though the method for injecting the gas oil is not particularly limited, a method of introducing the gas oil in a liquefied form with the aid of a pipe or a method of spouting the gas oil in conjunction with air and adding it in the form of mist to the catalyst may be used preferably.

Now, this invention will be described more specifically below with reference to working examples.

Example 1

A zirconia powder having copper carried thereon in a dispersed thereon state was obtained by thoroughly stirring 800 g of a zirconia powder having a BET specific surface area of 110 $m^2/g$ and an average primary particle diameter of 100 Å in an aqueous solution prepared by dissolving 540 g of copper nitrate and 128 g of iron nitrate in deionized water, drying the resultant mixture at a temperature of 150° C. for 2 hours, and further calcining the dried mixed at a temperature of 500° C. for 1 hour.

The powder thus obtained was wet ground into a slurry. A cylindrical honeycomb carrier of cordierite containing about 400 open-flow gas passing cells per square inch of cross-sectional area and measuring 5.66 inches in diameter and 6.00 inches in length was impregnated with the slurry. The wet impregnated honeycomb carrier was deprived of excess slurry, then dried at 150° C. for 2 hours, and thereafter calcined at 500° C. for 1 hour, to obtain a catalyst.

Example 2

A catalyst was prepared by following the procedure of Example 1 while using 270 g of copper nitrate and 64 g of iron nitrate instead.

Example 3

A catalyst was prepared by following the procedure of Example 1 while using 600 g of the same zirconia powder as in Example 1, 810 g of copper nitrate, and 192 g of iron nitrate instead.

Example 4

A catalyst was prepared by following the procedure of Example 1 while adding 800 g of the same zirconia powder as in Example 1 and 17.8 g of tungstic anhydride to an aqueous solution containing 540 g of copper nitrate instead.

Example 5

A catalyst was prepared by following the procedure of Example 1 while using an aqueous solution prepared by dissolving 540 g of copper nitrate, 89.8 g of iron nitrate, and 37.6 g of manganese nitrate in deionized water instead.

Example 6

A catalyst was prepared by following the procedure of Example 1 while using an aqueous solution having 540 g of copper nitrate and 69.2 g of nickel nitrate dissolved in deionized water instead.

Example 7

A catalyst was prepared by following the procedure of Example 1 while using 17.8 g of gallium oxide in place of 128 g of iron nitrate.

Example 8

A catalyst was prepared by following the procedure of Example 1 while using 64.4 g of cobalt nitrate in place of 128 g of iron nitrate.

Control 1

A catalyst was prepared by following the procedure of Example 1 while using 33.8 g of copper nitrate alone as a catalytic component.

Control 2

A catalyst was prepared by following the procedure of Example 5 while using 800 g of an alumina powder having a BET specific surface area of 145 $m^2/g$ in place of zirconia.

Control 3

A catalyst was prepared by following the procedure of Example 1 while using ferrierite (produced by To so K.K. and marketed under product code of "HSZ-720KOA") in place of zirconia.

Control 4

A catalyst was prepared by following the procedure of Example 2 while omitting the use of iron nitrate.

The compositions of the catalysts obtained in Examples 1 through 8 and Control 1 through 4 mentioned above are shown in Table 1 and Table 2. The numerical values given in Table 1 and Table 2 represent the amounts (g) used per liter of the three-dimensional structure. Example 9 (Evaluation of catalyst) The catalysts obtained in Examples 1 through 8 and Controls 1 through 4 were tested for ability to purge diesel engine exhaust gas by the following method. In this method, an overcharging direct injection type diesel engine (four cylinders, 2800 cc) was adopted and gas oil having a sulfur content of 0.04% by weight was used as fuel.

A given catalyst was attached to an exhaust gas pipe from the engine mentioned above. With the engine operated at a rate of 2500 rpm under full load, the catalyst was tested for durability for 100 hours under the condition of 700° C. of catalyst inlet temperature.

Then, the catalyst was ventilated under the conditions of 2000 rpm of engine speed and 200° C. of catalyst inlet temperature for 1 hour. Subsequently, the catalyst inlet temperature was set at 250° C., 300° C., 350° C., 400° C., and 450° C. by varying the torgue with the rate of the engine fixed at 2000 ppm, and the exhaust gas was sampled at the inlet and the outlet of the catalyst bed and the samples were tested for contents of $NO_x$ and particulates to find the ratios of purification.

The gas oil used as the reducing agent for the $NO_x$ was injected into the upstream of the catalyst bed at a rate such that the amount thereof to be consumed as a fuel fell at 3%. The removal ratio of $NO_x$ and the particulates were determined based on the inlet concentrations thereof in the absence of the use of gas oil and the actual outlet concentrations thereof. The results are shown in Tables 1 and 2.

TABLE 1

| Example | Amount of copper used (as element) | Added component | | Refractory inorganic oxide | | $NO_x$ removal ratio (%) | Particulates purifying ratio (%) |
|---|---|---|---|---|---|---|---|
| Example 1 | Cu 32 | $Fe_2O$ | 5 | $ZrO_2$ | 180 | 44 | 17 |
| Example 2 | Cu 16 | $Fe_2O$ | 2.5 | $ZrO_2$ | 180 | 35 | 10 |
| Example 3 | Cu 32 | $Fe_2O$ | 5 | $ZrO_2$ | 90 | 36 | 13 |
| Example 4 | Cu 32 | $WO_3$ | 4 | $ZrO_2$ | 180 | 46 | 16 |
| Example 5 | Cu 32 | $Fe_2O_3$ $MnO_2$ | 4 3 | $ZrO_2$ | 180 | 50 | 20 |
| Example 6 | Cu 32 | NiO | 4 | $ZrO_2$ | 180 | 44 | 15 |
| Example 7 | Cu 32 | $Ga_2O_3$ | 4 | $ZrO_2$ | 180 | 39 | 14 |
| Example 8 | Cu 32 | $Co_2O_3$ | 4 | $ZrO_2$ | 180 | 37 | 14 |

TABLE 2

| Control | Amount of copper used (as element) | Added component | | Refractory inorganic oxide | | $NO_x$ removal ratio (%) | Particulates purifying ratio (%) |
|---|---|---|---|---|---|---|---|
| Control 1 | Cu 2 | — | | $ZrO_2$ | 180 | 5 | −2 |
| Control 2 | Cu 32 | $Fe_2O_3$ $MnO_4$ | 4 3 | $Al_2O_3$ | 180 | 15 | 5 |
| Control 3 | Cu 16 | $Fe_2O_3$ | 2.5 | ferielite | 90 | 8 | 9 |
| Control 4 | Cu 16 | — | | $ZrO_2$ | 180 | 24 | 7 |

What is claimed is:

1. A method for the removal of nitrogen oxides in a diesel engine exhaust gas, which comprises exposing to a catalyst a diesel engine exhaust gas whose $HC/NO_x$ molar ratio is in the range of 0.5 to 20 (HC reduced to methane concentration), said catalyst comprising a refractory three-dimensional structure coated with a copper-containing refractory inorganic oxide powder comprising deposited copper, the copper content, as element, being in the range of 5–50% by weight based on said zirconia powder, and a catalytically active oxide of at least one metal selected from the group consisting of tungsten, gallium, nickel, manganese, iron, and cobalt, in the range of 2 to 40% by weight based on the copper, as element, on a zirconia powder, wherein said zirconia powder has a BET specific surface area in the range of 50 to 200 m²/g and an average primary particle diameter in the range of 50 to 200 Å.

2. A method according to claim 1, wherein a temperature of said exhaust gas into which said reducing agent is injected is in the range of 200° to 500° C.

3. A method according to claim 1, wherein said reducing agent is gas oil.

4. The method of claim 1 wherein said refractory three-dimensional structure is an open-flow ceramic honeycomb or metal honeycomb.

5. The method of claim 1 wherein the copper content, as element, is in the range of 5 to 50% by weight based on said zirconia powder.

6. The method of claim 1 wherein the amount of said zirconia powder is in the range of 50 to 250 g per liter of said refractory three-dimensional structure.

7. A method for the removal of nitrogen oxides in a diesel engine exhaust gas, to an extent that $HC/NO_x$ molar ratio being in the range of 0.5 to 20 (HC reduced tomethane concentration) which comprises injecting a reducing agent into said diesel engine exhaust gas and exposing said exhaust gas to a catalyst, said catalyst comprising a refractory three-dimensional structure coated with a copper-containing refractory inorganic oxide powder comprising deposited copper, the copper content, as element, being in the range of 5–50% by weight based on said zirconia powder, and a catalytically active oxide of at least one metal selected from the group consisting of tungsten, gallium, nickel, maganese, iron, and cobalt, in the range of 2 to 40% by weight based on the copper, as element, on a zirconia powder, wherein said zirconia powder has a BET specific surface area in the range of 50 to 200 m²g and a average primary particle diameter in the range of 50 to 200 Å.

8. A method according to claim 7, wherein a temperature of said exhaust gas into which said reducing agent is injected in the range of 200° to 500° C.

9. A method according to claim 8, wherein said reducing agent is gas oil.

10. The method of claim 7 wherein said refractory three-dimensional structure is an open-flow ceramic honeycomb or metal honeycomb.

11. The method of claim 7 wherein the copper content, as elements is in the range of 4 to 100 g per liter of said refractory three-dimensional structure.

12. The method of claim 7 wherein the amount of said zirconia powder is in the range of 50 to 250 g per liter of said refractory three-dimensional structure.

* * * * *